United States Patent [19]

Huang

[11] Patent Number: 4,920,831
[45] Date of Patent: May 1, 1990

[54] VEHICLE-CARRYING PURPOSE WRENCH

[75] Inventor: Chan S. Huang, Taipei, Taiwan

[73] Assignee: Dora Hsiao Ling Huang, Taipei Hsien, Taiwan

[21] Appl. No.: 185,246

[22] Filed: Apr. 19, 1988

Related U.S. Application Data

[63] Continuation-in-part of Ser. No. 900,176, Aug. 25, 1986, Pat. No. 4,727,780.

[51] Int. Cl.⁵ ............................................. B25B 13/00
[52] U.S. Cl. ..................................... 81/54; 81/57.14; 81/63
[58] Field of Search ................... 81/54, 57.14, 63, 33, 81/14, 61, 62; 173/163, 104, 117

[56] References Cited

U.S. PATENT DOCUMENTS 2,728,365 12/1955 Austin ................................. 81/54

Primary Examiner—Frederick R. Schmidt
Assistant Examiner—Maurina Rachuba
Attorney, Agent, or Firm—Balogh, Osann, Kramer, Dvorak Genova & Traub

[57] ABSTRACT

This invention relates to a portable vehicle-carrying wrench which provides controlled torque to prevent damage to related elements, comprising a housing assembly, a tool assembly and a trigger assembly, in which the housing assembly includes a motor casing, a tool casing, a front and rear cover and a handle. The tool assembly is located in the interior of the tool casing and the rotation force of a reversible motor is transmitted to a drive member. By means of an arrester installed inside a main body, the front and rear position moving can be controlled according to the rotation speed, serving as a means to further exert an indirect control over a follower shaft to determine whether it will be continuously operated or not, so as to enable the motor to be regulated into positive or reversible output according to its actual requirements and hence to achieve the purpose of tightening or loosening bolts or nuts used for mounting a tire on a vehicle.

1 Claim, 6 Drawing Sheets

VEHICLE-CARRYING PURPOSE WRENCH

This application is a continuation-in-part of application Ser. No. 900,176 filed Aug. 25, 1986 Pat. No. 4,727,780.

SUMMARY OF THE INVENTION

This invention relates to vehicle-carrying wrench, particularly a wrench which is connected to electric power by means of direct plug-in of its plug into a lighter socket of the vehicle to energize a reversible motor to produce a clockwise or an anticlockwise rotation to enable a tool assembly to dismount a punctured tire within a very short time. Also, by means of exerting a control over a follower shaft by means of an arrester installed inside a main body of the motor to determine whether it is to be continuously operated, as a means to prevent damage caused to mounting elements by excessive torque.

For removing a tire, a tool assembly must have sufficiently high torque to loosen and remove bolts or nuts securing the tire on a wheel. Presently, the tool assembly which is most commonly utilized by motor vehicle drivers or automobile maintenance workshop mechanics are classified into two categories. One is a special vehicle-carrying wrench operated manually for the displacement of flat tires and the other one is a pneumatic wrench operated by an air compressor, which will displace a flat tire. However, many defects are found in these conventional wrenches due to the inconveniences caused to vehicle drivers under some special circumstances. For instance, in the structure of the manually operated wrench for tire displacement, a hexagonal socket and lever matching with the size of the tire nuts are provided. They are either integrally cast or formed in an assembly type to economize its space for easy portability. However, for the purpose of ensuring stability and safety of the vehicle in motion, much emphasis has been put on tightly fixing nuts and the evenness of torque, which has been applied on the automobile assembly line. Therefore, in the event of a punctured tire or of an insufficient air pressure, due to the unavailability of air compression equipment, simple tools have to be used manually for tire displacement.

Although much energy and sweat had been spent in an attempt to loosen the nuts, the driver often found it impossible to loosen the nuts due to the fact that they had been too tightly installed during an initial stage of assembly. Such inconvenience seemed particularly more serious for female drivers. At length, they had to seek help from men or phone a maintenance workshop. Equal inconvenience is found in the air compression equipment which is used by maintenance workshops.

In view of the restraints and inconveniences found in the aforementioned conventional tire displacement processes, the inventor concluded that it was absolutely necessary to overcome these defects. After having gone through four years of continuous research work, a solution was found by means of this invention.

That is to say, the main object of this invention is to provide a mechanical type of vehicle-carrying electric wrench which saves energy and space and is connectible to electric power available in an automobile's lighter socket and can also control a follower shaft automatically to determine whether a continued torque is required or not, so as to prevent damage to related mounting elements from use of excessive torque.

BRIEF DESCRIPTION OF THE DRAWINGS

The invention will be more readily understood from the following detailed description, especially in light of the accompanying drawings, wherein like numerals refer to corresponding parts in the several diagrammatic views, in which.

BRIEF DESCRIPTION OF THE PREFERRED EMBODIMENT

Figure 1:
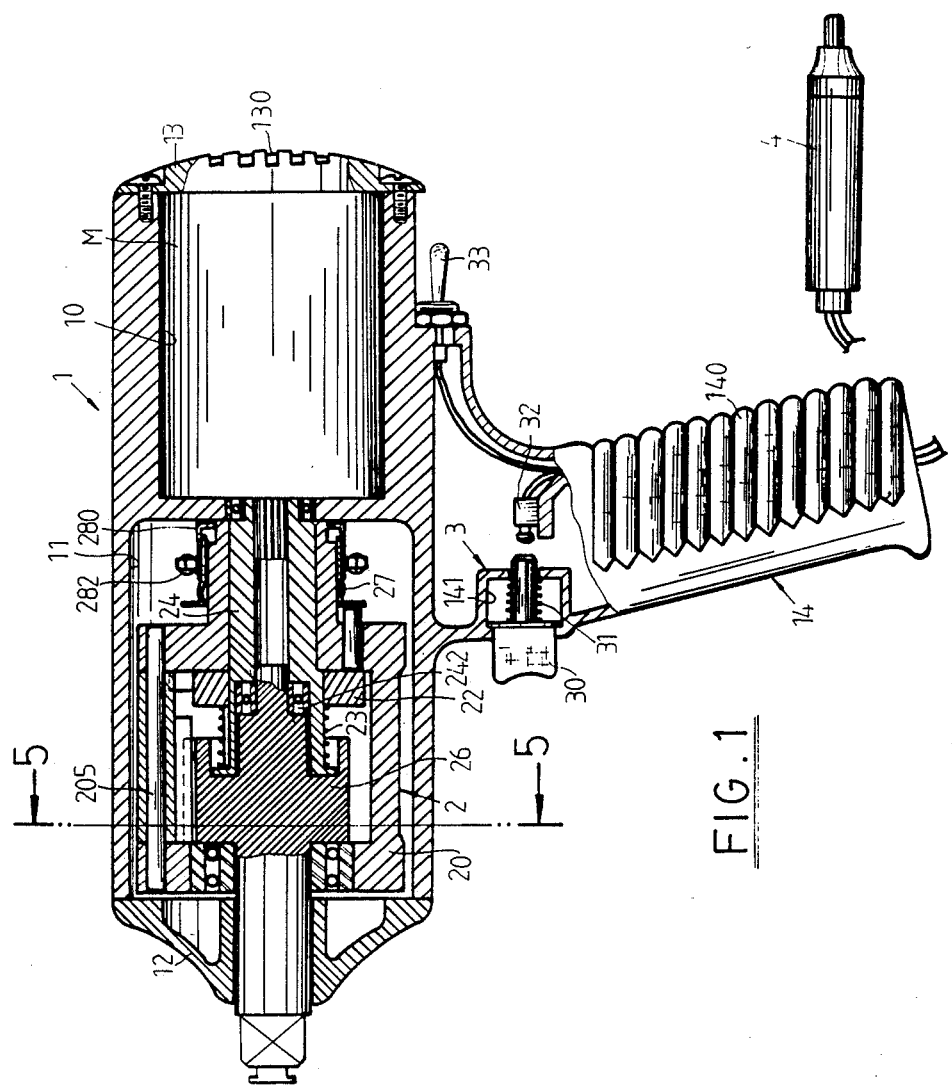
FIG. 1 is a partial cross sectional view of the preferred embodiment of the present invention.

By referring to FIG. 1, it can be seen that the present invention mainly comprises a housing assembly 1, a tool assembly 2, a trigger assembly 3, and a plug 4, wherein the housing assembly 1 consists of a motor casing 10, a tool casing 11, a front cover 12 and a rear cover 13 and a handle 14. The interior elements of the motor casing 10 include a reversible motor M which is energized via the source of power which can be obtained by the plug-in of plug 4, insertable into the automobile's lighter socket. The tool casing 11 is located at a position immediately close to the lateral side of the motor casing 10, having in its interior the tool assembly 2. The front cover 12 is tightly fixed by screws into the lateral sides of the tool casing 11 and the rear cover 13 is also tightly fixed in the same manner onto the lateral side of the motor casing 10, the cover 13 having several radiator louvers 130. The handle 14 is secured to the lower portions of the motor casing 10 and the tool casing 11, and resembles the shape of a handle of a pistol with straight line stripes 140 on its surface for firm holding, and having a trigger assembly 3 located at its interior upper direction. The trigger assembly 3 is formed by having a compression spring 31 biasing a T-shaped button block 30 which is housed in a rectangular shaped body 141 inside the handle 14. A rod 31 has one end of the aforementioned T-shaped button block 30 projecting out of the rectangular shaped body 141 and in alignment with a micro switch 32 at the rear, so as to control a steering control device 33 which exerts a control over the positive/reversible steering of the rotational direction of the reversible motor M.

Figure 2:
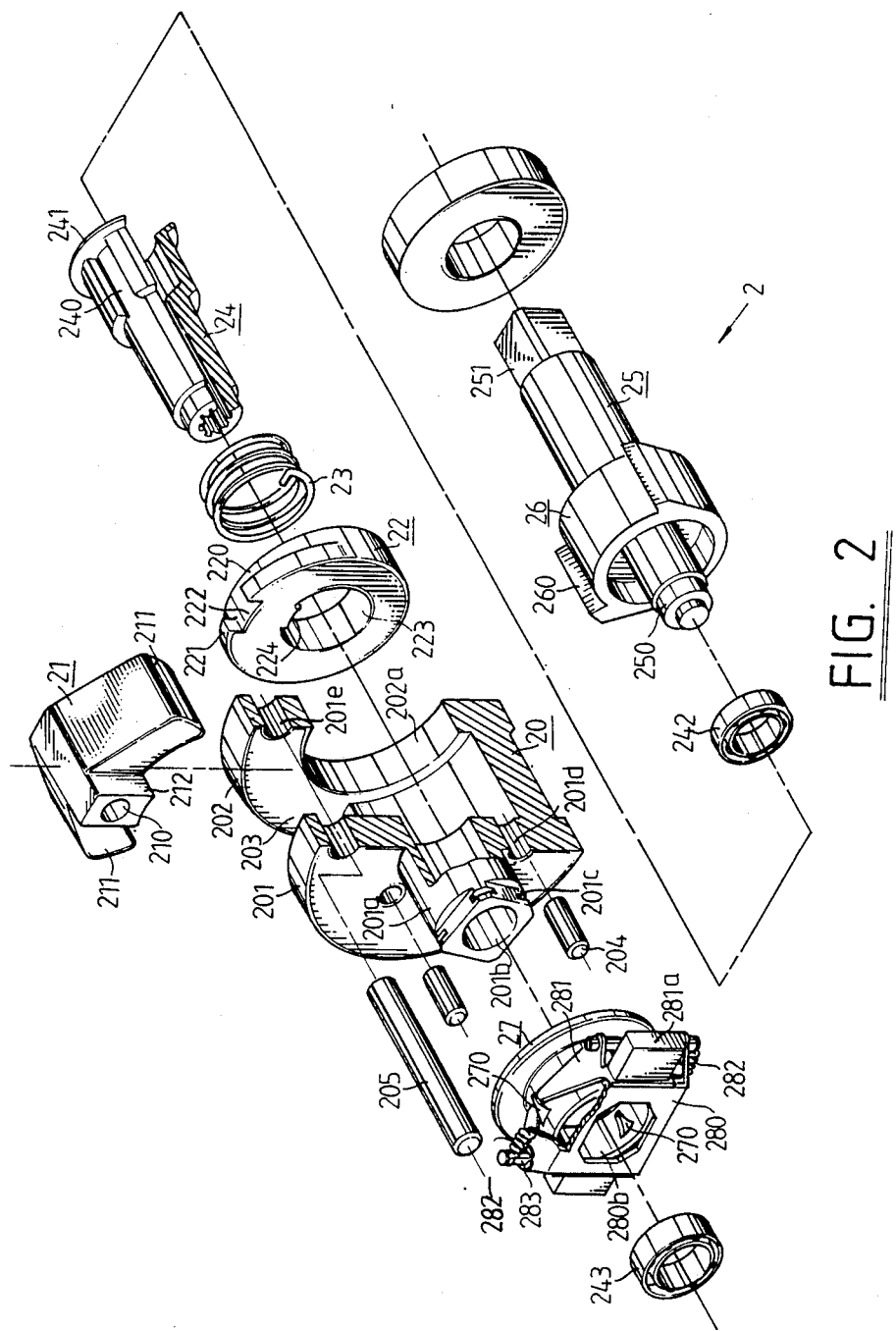
FIG. 2 is a fragmented perspective view of a tool assembly of the present invention.
Figure 3:
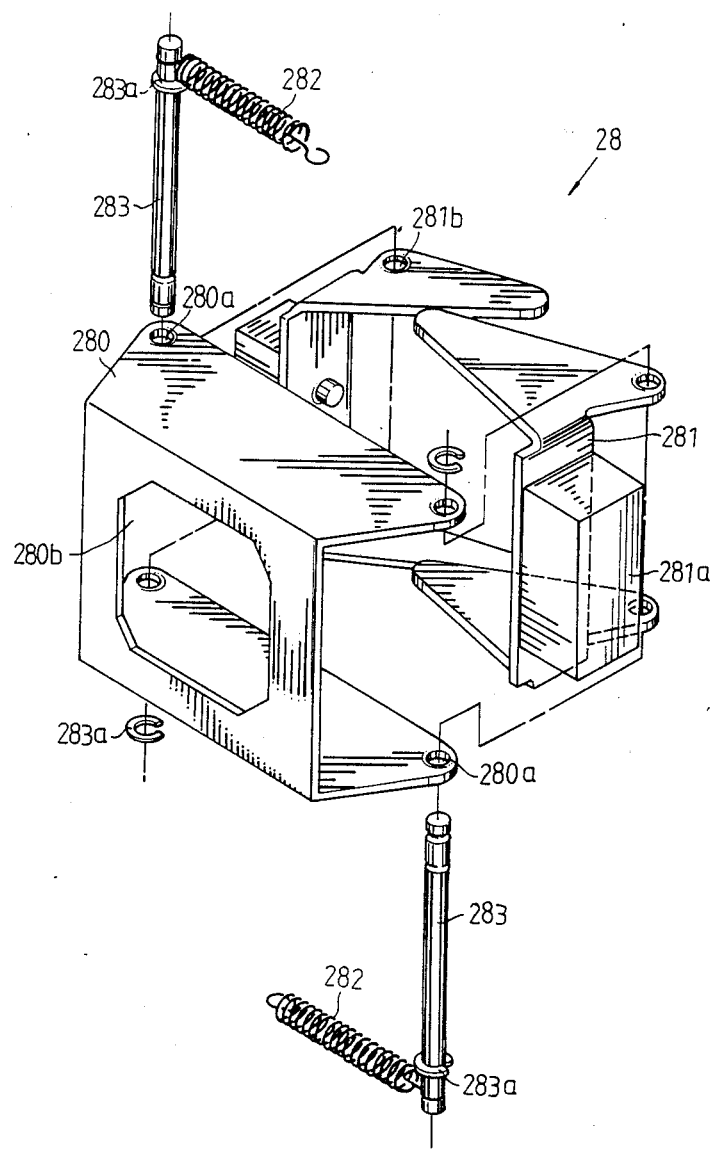
FIG. 3 is a fragmented perspective view of an arrester of the present invention.
Figure 4:
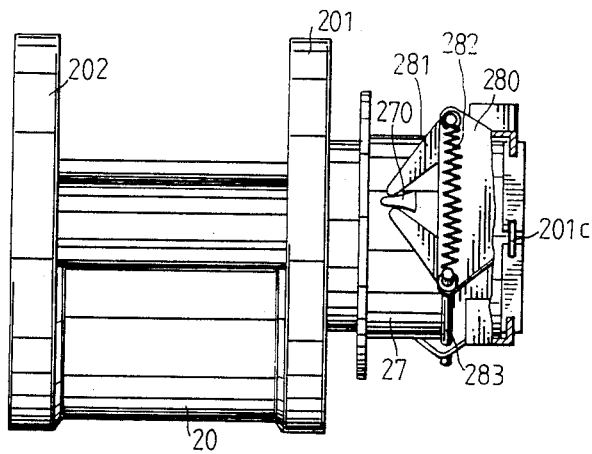
FIG. 4 is a side view showing how the arrester is secured tightly against a related position of a container body of the present invention.
Figure 5:
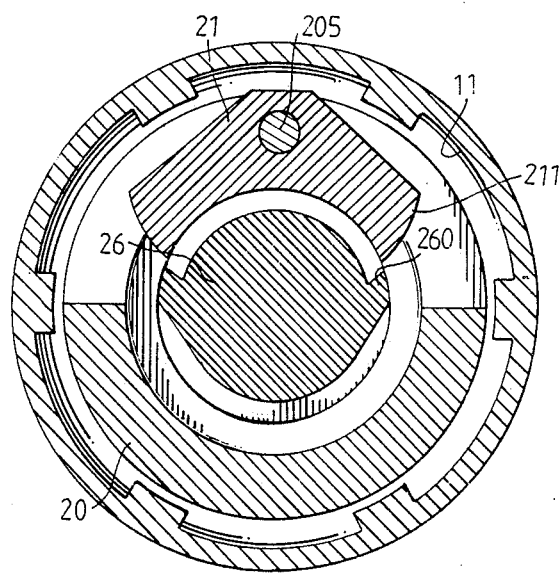
FIG. 5 is a cross-sectional view taken along line 5—5 of FIG. 1 of the present invention.
Figure 6:
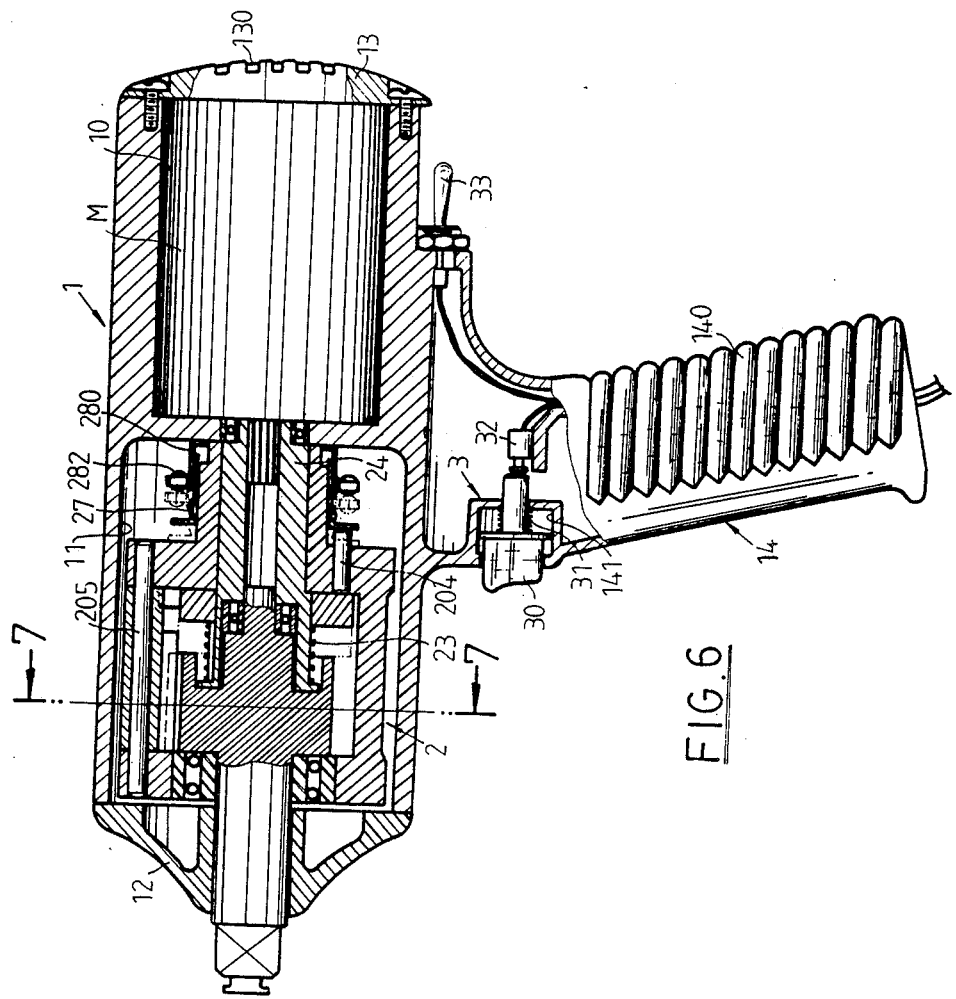
FIG. 6 is a fragmented perspective view illustrating the motion conducted by the present invention.
Figure 7:
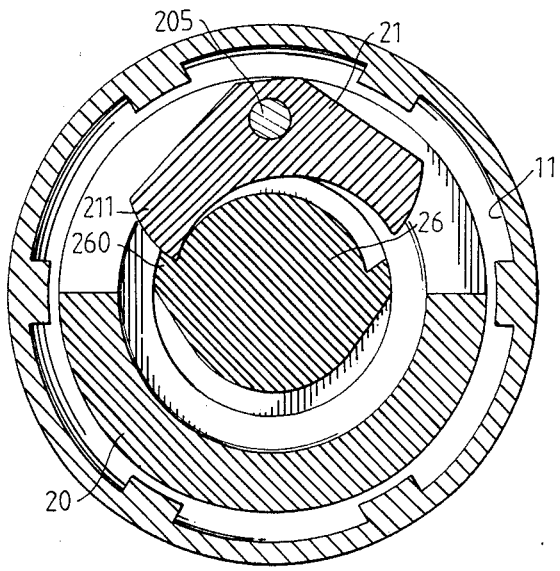
FIG. 7 is a cross-sectional view taken along line 7—7 of FIG. 6 of the present invention.
Figure 8:
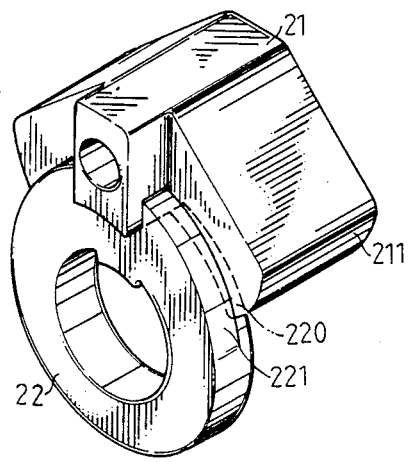
FIG. 8 is a perspective view illustrating the relative position between a main drive member and a transmission control member when an elastic member is under a compressed situation.
Figure 9:
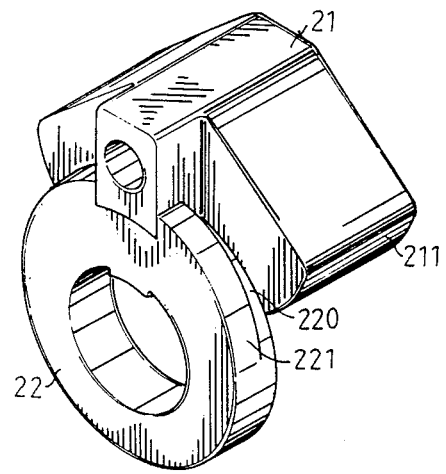
FIG. 9 is a perspective view illustrating the relative position between a main drive member and a transmission control member when an elastic member is not under a compressed situation.

Referring to FIG. 2, it can be seen that the elements of the tool assembly 2 of the present invention comprises a main body 20, a drive member 21, a transmission member 22, an elastic member 23, a drive shaft 24, a follower shaft 25, a follower member 26, a convex disk 27, an arrester 28, etc., in which the main body 20 consists of a first side wall 201, a second side wall 202 and a hollow space 203 existing in a space between the first and the second side wall 201, 202, having a projected circular tube 201a set at the center of the first side wall 201 to enable the drive shaft 24 to be sleeved together with the convex disk 27 on the same tube path inside the tube opening. The sidewall 201 has an appropriate length at the end projecting in a circular tube 201a cut into a spherical angled rectangular shape 201b and a notched slot 201c set at each of the circular spherical angles. By means of the aforementioned notched slot 201c, the arrester 28 is composed of an assembly of a C-shaped fixed piece 280, two U-shaped pushing pieces, 281, two elastic springs 282 and two pin rods 283 as shown in FIG. 3. At each side of each of the two U-shaped pushing pieces 281, a counter balance weight block 281a is secured, the weight of which can be selected according to the particular horsepower output, to produce a centrifugal force when the motor M is being driven to facilitate the position movement of angles, so as to further exert a driving force on the convex disk 27. The positions of the U-shaped pushing pieces 281 are so designed that their openings are set opposing one another and are sleeved into the hollow part of the C-shaped fixed pieces 280. Pin holes 281b are correspondingly connected with pin holes 280a of the upper and lower pieces of the C-shaped fixed pieces 280, with a pin rod 283 being used therein to connect them together. A C-shaped ring 283a is also used to sandwich the pin rod 283 located at the upper portion of the C-shaped fixed pieces 280 inside the notched slot 201c, enabling the pin rod 283 to be joined together with the two C-shaped fixed pieces 280. At this time, feet of U-shaped pushing pieces 281 inter-sandwich the convex disk 27, so as to get it in touch with a triangularly projected edge 270 which projects out of the tube path. Then, join the elastic springs 282 onto the ends of the two pin rods 283 located at the upper and the lower planes of the C-shaped fixed pieces 280 and thus accomplish the assembly of the arrester 28. Again, by means of an inverted angle of square aperture 280b located at the connecting plane of the C-shaped fixed piece 280, the integral structure can then be tightly sandwiched in the notched slot 201c of the projected circular tube 201a of the main body 20 as shown in FIG. 4. Owing to the functioning of the return force of its two elastic springs 282, a spring-back force will be produced by the feed of the two U-shaped pushing pieces 281 to force the convex disk 27 to keep close to its side under an ordinary situation. If an external force is being applied (i.e. the rotation of a motor), due to the functioning of the counter balance weight block 281a located on the two U shaped pushing pieces 281, a centrifugal force will be produced which will result in the production of position moving of angles by the two U-shaped pushing pieces 281. This will cause the convex disk 27 to conduct a position moving towards the direction of the first lateral wall 201 of the main body 20 until the centrifugal force of the two U-shaped pushing pices 281 becomes smaller than the return force produced by the two elastic springs 282. This will cause the two U-shaped pushing pieces 281 to resume their former positions, so that the feet of the two U-shaped pushing pieces 281 will once more push the convex disk 27 back to its former position. It is a method which will, by means of the output volume of the rotating force produced by the motor M, exert a control over a scale of the centrifugal force produced by the two U-shaped pushing pieces 281 at the upper direction of the arrester 28. The arrester 28 will determine whether it is necessary to produce the position moving of angles and to further indirectly exert a control over the moving of the convex disk 27. In the main body 20, in addition to having a projected circular tube 201a set at the center of the first side wall 201 for the mounting of the convex disk 27 and for the tight sandwiching of the arrester 28, a pin hole 201d is also set at each of the appropriate radius at an interval of 120 degrees away from the center of the first side wall 201, into which the moveable pin 204 can be inserted. In addition, a pin hole 210c of a comparatively larger bore passes from the first side wall through the second wall 202 at the hollow part to facilitate a tight fixing of the drive member 21 in the space between the two side walls by a fixed pin 205. Due to the fact that the external diameter of fixed pin 205 is slightly smaller than the bore of the drive member 21, the drive member 21 is free to conduct a left and right rotation and a backward and forward motion. The drive member 21 is composed of a wing part 211 having its two lateral sides slightly dropped slantingly downward and an extension part 212 projecting beyond the wing part 211. For a better understanding, please refer to the drawings of FIG. 5 and FIG. 7. Looking at the right side view of the drive member 21, it can be seen that the plane of the interior edge of its two lateral wing parts 211 is formed in the shape of an appropriate circular spherical plane and, its radius of curvature is in coordination with a first circumference 220 of the driving control device 22. In other words, when the drive control device 22 is being placed inside the hollow part 203 of the main body 20, its first circumference 220 will slightly get in touch with the circular spherical plane of the interior edge of the drive member 21. In addition to having a first circumference 220, there is another large circumference 221 lying in front of the first circumference 220. In the upper portion of the large circumference 221, there is an opening 222 equivalent to and corresponding with the width of the extension part 212 of the drive member 21 to facilitate its moving into the extension part 212 of the drive member 21 (as shown in FIG. 8 or FIG. 9). Moreover, an aperture 223 is provided with a rectangular key 224 to enable the drive shaft 24 to pass through the aperture 223, as well as to enable the key slot 240 of the drive shaft 24 to be housed into the rectangular key 224 of the aperture 223, so as to allow the former and the latter to conduct a synchronized motion. One end of the drive shaft 24 will pass through the apertures at the centers of the elastic member 23, the transmission member 22 and the projected tube 201a of the first side wall 201 of the main body 20. Then the drive shaft 24 will be inserted into and joined with the output shaft of the motor M, so as to receive the rotating force exerted by the motor M. A stop ring 241 projects out of the other end to prevent the elastic member 23 from falling off that end. A bearing 242 is mounted in the aperture of that end to facilitate the mounting of the binding end 250 of the follower shaft 25. At a position where the follower shaft 25 is adjacent to the binding end 250, a follower member 26 is tightly set and is in the formation of a circular ring body, having a tooth part 260 projecting upwards adjacent to each of its two lateral sides. The interior edge circular spherical plane of the drive member 21 and the first circumference 220 of the transmission member 22 are in a separate condition. Therefore, the drive member 21 is free to conduct left and right rotations. When the plug 4 is inserted into the lighter socket for power supply, press down the T shaped button block 30 to contact the micro switch 32 located at the rear direction to get the rotor of the reversible motor M started. At the time when the main body is in motion, due to the functioning of the centrifugal force, the drive shaft 24 will rotate in the same direction as that of the main body 20. The drive shaft 24 will then ram onto the tooth part 260 of the follower member 26. As is shown in FIG. 7, the follower shaft 25 will then be activated to motion by means of the ramming. In this manner, the wrench which is mounted at the end of the square shaft 251 of the follower shaft 25 will then be able to lock or unlock the nuts. At the same time of the rotating operation of the main body 20, the convex disk 27 and the arrester 28 which are mounted on its projected circular tube 201a can also be activated for rotation. When the rotating force of the arrester 28 is at a speed which is high enough to force the centrifugal force of the two U-shaped pushing pieces 281 located at its upper direction to produce an opposing position moving of angles, the feet of the two U-shaped pushing pieces 281 will cause the convex disk 27 to move closely toward the direction of the first side wall 201 of the main body 20, so as to further push the movable pin 204 toward the direction of the main body 20 to exert a force to push the transmission member 22 toward the direction of the second side wall 202. This will cause the first circumference 220 of the transmission member 22 to get in touch with the interior edge circular spherical plane of the drive member 21 as is shown in FIG. 8. This will prevent the left and right rotation of the drive member 21 and discontinue driving the transmission member 26 and the follower shaft 25. Once the rotation of the drive member 21 has been controlled, the wing part 211 of the drive member 21 will not ram against the tooth part 260 of the transmission member 26. That is to say, a considerable distance will be kept between the two parts, so as not to produce a universal driving as is shown in FIG. 5. It will enable the transmission member 22 and the main body 20 to produce an idle running as shown by motion indicated in FIG. 6.

Summarizing the above description, it is understood that the vehicle-carrying wrench presented by the present invention is one which can be directly plugged into the lighter socket of the vehicle for power supply. The steering and starting of its motor is controlled through the switching of its start button to activate the rotation of the rotor of the reversible motor. The rotating force of its motor is conveyed through the drive member of the tool assembly onto the transmission member and the main body.

What I now claim is:

1. A vehicle-carrying wrench, comprising:
   a housing assembly, having:
   a motor casing;
   a tool casing, integrally formed with the motor casing;
   a front cover, tightly fixed by screws to the tool casing;
   a rear cover, tightly fixed by screws to the motor casing, said rear cover having several radiator louvers;
   a handle integrally formed with the motor housing, said handle resembling a pistol grip and having stripes to facilitate holding, a trigger switch mounted on the forepart of the handle and a direction control switch mounted on the rear part of the handle;
   a reversible motor, mounted inside the motor casing, a plug and cord means connected to said motor for supplying electrical power thereto, said plug being connectible to a lighter socket in the vehicle;
   a tool assembly contained inside the tool casing, the tool assembly comprising:
   a main body, including a first side wall, a second side wall and a space existing in between the two side walls, a projected circular tube located in said space at the center of the first side wall, a notched slot having a predetermined depth is set at an end of said tube having a circular spherical angle and having a number of apertures in said first side wall located at an appropriate radius away from the center of the circular tube, movable pins which are longer in length than the wall thickness of the first side wall being contained in said aperture;
   a drive member mounted in said space by a fixed pin passing through an aperture in the first and second side walls, said drive member having a wing part extending outwardly and slanting downwardly from a lateral side of its body and an extension part extending out of a ridge and projecting at the width of the wing part;
   a transmission member, having a shape of a hollow ring body, having first and second circumferences, wherein the radius of curvature of the first circumference is similar to that of an interior edge circular spherical plane of the wing part located at the two lateral sides of the drive member, an aperture notched slot is located at the upper portion of the second circumference to facilitate the mounting of an extension part of the drive member and a square shaped button extending inside the hollow ring body;
   a main drive shaft in the shape of a hollow cylindrical body, said main drive shaft having hollow bores at both of its two ends, a bearing mounted in a first bore in one of the ends and another bearing mounted in a second bore at the other end which is to be connected with a follower shaft, including a ring shaped stop ring projecting from the end adjacent said second bore and including a button notched slot;
   an elastic member mounted on the drive shaft and located at the rear portion of the transmission member and abutting said stop ring, a follower shaft with one of its ends piercing through the hollow main drive shaft and a bearing mounted at the other end which is in the shape of a square cylindrical body for receiving the wrench; a follower member tightly fixed to the follower shaft and resembling a ring-shaped body, having a tooth part projected outwardly from its periphery;
   an arrester, comprising two slightly U-shaped pushing pieces attached to counter balanced weight blocks via connecting planes, said U-shaped pieces to be mounted at each of the C-shaped fixed pieces and are coupled together by pin holes and two pin rods which are secured with C-shaped rings to enable each of the two U-shaped pushing pieces to be connected at the lateral side of the C-shaped fixed pieces, elastic springs are mounted to connect the ends of the pin rods which are located on the upper and the lower planes of the C-shaped fixed pieces, a convex disk is sandwiched by feet of the two U-shaped pushing pieces and a triangular shaped projecting edge on said convex disk is being engaged by the tips of the feet as a result of centrifugal force, whereby the tips of the feet of the U-shaped pushing pieces control the movement of said convex disk.

* * * * *